United States Patent [19]

Smith et al.

[11] Patent Number: 6,091,418
[45] Date of Patent: *Jul. 18, 2000

[54] PRINTER WITH PROCEDURE FOR PATTERN TILING AND SCALING

[75] Inventors: Marcus A. Smith; Christopher T. Creel, both of Boise, Id.

[73] Assignee: Hewlett-Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/878,931

[22] Filed: Jun. 18, 1997

[51] Int. Cl.[7] .............................. G06T 1/00; G06T 11/80
[52] U.S. Cl. ............................................. 345/418; 345/435
[58] Field of Search .................................. 345/418, 429, 345/430, 435, 438

[56] References Cited

U.S. PATENT DOCUMENTS

| | | | |
|---|---|---|---|
| 5,262,767 | 11/1993 | Takeda | 345/133 |
| 5,299,299 | 3/1994 | Ohuchi | 395/126 |
| 5,717,845 | 2/1998 | Patrick et al. | 345/438 |

FOREIGN PATENT DOCUMENTS

| | | | |
|---|---|---|---|
| 0249285A | 12/1987 | European Pat. Off. | G06T 11/40 |
| WO9500919A | 1/1995 | WIPO | G06T 11/40 |

OTHER PUBLICATIONS

European Search Report.

*Primary Examiner*—Mark R. Powell
*Assistant Examiner*—Thu Nguyen

[57] ABSTRACT

A method and apparatus enables derivation of a bitmap representation of an image, where the image includes a region filled with a pattern. The method includes the steps of: accessing an original pattern bitmap segment from within the image; translating a copy of the original pattern bitmap segment to the origin of the bitmap representation of the image as a reference pattern bitmap and arranging it as a reference pattern bitmap with a pattern that evidences a consistent phase regularity with the original pattern bitmap segment; filling the region to be filled with the pattern by determining a correspondence of an anchor pixel of the region to a pixel in the reference pattern bitmap; ascribing an attribute of the corresponding pixel in the reference pattern bitmap to the anchor pixel of the region; and repetitively determining correspondence of each further pixel in the region to a further pixel in the reference pattern bitmap and ascribing an attribute of each further pixel of the reference pattern bitmap to each further pixel in the region, until all pixels in the region have been processed.

10 Claims, 5 Drawing Sheets

PRINTER WITH PROCEDURE FOR PATTERN TILING AND SCALING

FIELD OF THE INVENTION

This invention relates to conversion of images from an intermediate code format into a rasterized bitmap suitable for printing and, more particularly, for a rasterizing procedure which provides a "just-in-time" tiling and scaling of a pattern image for the rasterized image.

BACKGROUND OF THE INVENTION

Modern laser and inkjet printers generally receive image data from host processor, with the image data being formatted either in a control language format or a pixel-based bitmap format. When the host processor provides image data in a control language format (e.g., Printer Control Language (PCL), PostScript etc.), the receiving printer initially parses the control language into a "page intermediate" format. The page intermediate format segregates a page of data into page strips which are handled as integral units and enable a conservation of raster buffer memory. For instance, a printer may allocate sufficient buffer memory to handle only three page strips, whereas an entire page may comprise 8 to 10 page strips. By handling the page strips serially, page strip buffer memory regions can be reused for succeeding page strips, thereby preserving memory space for other printer functions.

Each page intermediate page strip is converted by a rasterizer into a bitmap format which is suitable for rendering by a connected print engine (i.e, either a laser, inkjet or equivalent print engine). The rasterizer function, in high performance printers, is often performed by an image processor chip whose operations are controlled by a control program.

There are two general command categories that the image processor understands: (I) a page intermediate descriptor of a geometric object or a pre-rasterized picture; and (ii) graphics state information. Geometric object information enables the image processor to set appropriate pixels in a current page strip to reflect the particular parameters of a geometric object. In a sense, the image processor draws the object into the current page strip. Such geometric objects include: rule operations; trapezoid operations; short, thin vector operations; short, triangle operations; etc., etc. Pre-rasterized pictures are handled "as is", as they are already in a rasterized form and are therefore able to be fed directly to the print engine. A further set of objects that are fed to the image processor are "graphics state" objects which include patterns; clipping windows; and various logical operations; etc.

When the image processor is provided with page intermediate data, including both geometric object descriptions and graphics state information, such information is provided in the form of a display list. Display lists are static structures containing either marking or non-marking objects. Within any particular display list, the order of non-marking to marking objects is important. Since the display list is traversed in a first-in/first-out manner, the graphics state objects must precede any marking object because the marking object may depend upon the state constructed from previous objects. For instance, it is the programmer's job to construct the display list to assure that red vector objects are preceded by all graphics state objects that are necessary to describe a red solid vector (or any other specified color).

Pattern descriptions are indicated by a pattern display list object. A pattern is an arrangement of pixels for an image area to be filled with the pattern which provides a recurring background image. Unlike color, patterns do not indicate color, rather they mask (or hide) color. Color and patterns objects are sent to the image processor which combines the respective operators to provide the desired color space representation of the received pattern arrangement.

Often, a received pattern must be scaled and/or tiled to fit within current dimensions of a marking object (e.g. a square, triangle, rectangle . . . etc.). Pattern scaling must occur whenever the pattern does not fit into the user-defined or default input window. Inconsistencies in scale must be addressed before tiling is performed. For example, consider a very small pattern that is downloaded from the host processor. The host processor, wanting to conserve transfer time and processing assets, sends a "thumbnail" of the pattern to the printer. Along with the thumbnail, the host processor sends scaling ratios by establishing destination window parameters that are larger than the source window. Before the pattern is consumed by the printer, it must be scaled to the destination window. Pattern scaling is akin to general raster scaling and, in fact, uses the same algorithms.

When a printer rasterizes a pattern image, individual scan lines of the pattern are accessed as needed. If the image processor wishes to fill a portion of a scan line that is larger than the pattern width, then the pattern is "tiled" i.e., repeated, in order to fill the scan line. Pattern tiling occurs when a scale pattern is not large enough to cover the surface area of the marking object from the display list. This necessitates the need to re-index through the tile representation of the pattern and to re-use portions previously used.

Since the image processor supports the tiling action, the programmer can reduce the amount of memory required by allocating memory to store only the unique portions of a pattern, which are then reused as necessary.

The image processing function in a printer must be able, during a tiling operation, to anchor a tile of a pattern anywhere on a page strip and still tile the pattern as though it is anchored at (or close to) the X=0, Y=0 origin point of the page strip—i.e., generally the upper left corner of the page strip. Further, since page strips are printed, one after the other, down the length of a page, the periodicity of a pattern must be maintained from page strip to page strip, or else there will be discontinuities in the pattern image at the page strip boundaries. Thus, when a pattern appears in one page strip, the "phase" of the pattern must be consistently handled from page strip to page strip in the tile action to avoid such discontinuities. As a result, the necessity to be able to anchor a pattern anywhere within a page strip dictates that the proper pixel positions to access in the pattern must be able to be found, give the position of the original pattern anchor and the anchor of the object which is to be filled by the pattern.

Prior art printers have generally handled the scaling, tiling and anchoring of pattern arrangements during the page intermediate processing, before presentation to the image processor. Such a processing technique can be very costly and redundant, especially in the case of high frequency patterns (e.g. ones which exhibit repetitions of every five or fewer pixels).

Accordingly, it is an object of this invention to provide an improved procedure for the handling of graphics state information during a rasterizing action in a printer.

It is another object of this invention to provide a method and apparatus for handling graphics state information which enables a rasterizer, on a real time basis, to convert graphics state information into a bitmap presentation.

SUMMARY OF THE INVENTION

A method and apparatus enables derivation of a bitmap representation of an image, where the image includes a region filled with a pattern. The method includes the steps of: accessing an original pattern bitmap segment from within the image; translating a copy of the original pattern bitmap segment to the origin of the bitmap representation of the image as a reference pattern bitmap and arranging it as a reference pattern bitmap with a pattern that evidences a consistent phase regularity with the original pattern bitmap segment; filling the region to be filled with the pattern by determining a correspondence of an anchor pixel of the region to a pixel in the reference pattern bitmap; ascribing an attribute of the corresponding pixel in the reference pattern bitmap to the anchor pixel of the region; and repetitively determining correspondence of each further pixel in the region to a further pixel in the reference pattern bitmap and ascribing an attribute of each further pixel of the reference pattern bitmap to each further pixel in the region, until all pixels in the region have been processed.

DETAILED DESCRIPTION OF THE INVENTION

To enable rapid, just-in-time rendering of a pattern to a rasterized bitmap image, a back-propagation procedure is employed to transform an anchor point of an original pattern bitmap back to the vicinity of the origin of the page strip. The back propagation stops when the original pattern anchor point is first moved to a coordinate having a value $\leq X=0$, $Y=0$ in the page strip. Once so oriented, the original pattern bitmap is hereafter referred to as the reference pattern bitmap. Thereafter, each pixel of a region that is to be filled with the reference pattern is assigned an attribute from a reference pattern pixel. To perform the attribute assignment, a calculation is used which can be carried out on a current basis, during the rasterizing procedure.

Figure 1:
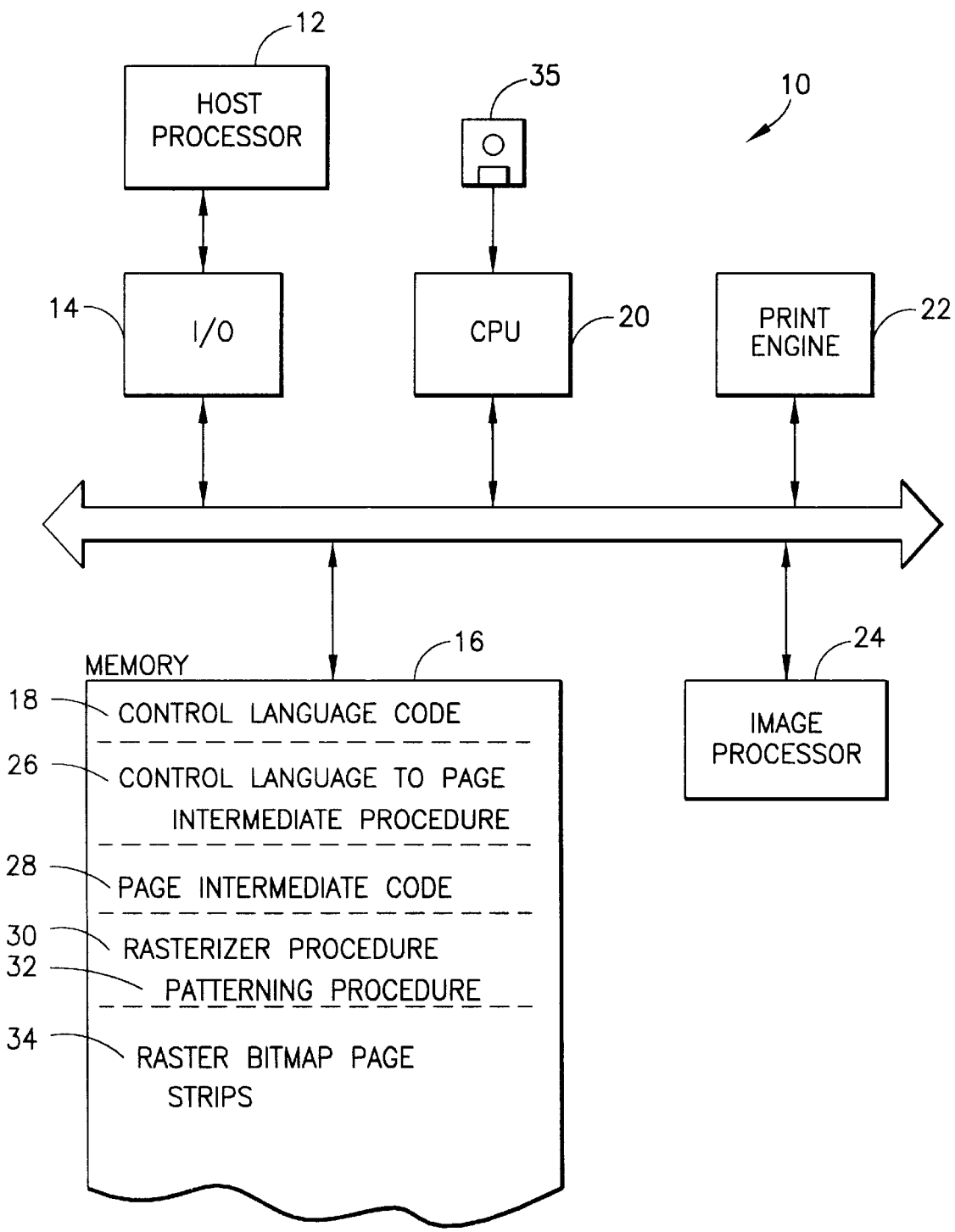
FIG. 1 is a block diagram of a printer system particularly adapted to perform in the invention.

Referring first to FIG. 1, a printer 10 receives image data from host processor 12, the image data being formatted in a control language (i.e. PCL, PostScript, etc.). The image data is received by input/output (I/O) interface 14 and is buffered in area 18 of memory 16. A central processing unit (CPU) 20 controls the overall operations of printer 10 in accordance with procedures stored in memory 16. Printer 10 further includes a print engine 22 and an image processor module 24 which is utilized during the rasterization process.

Within memory 16 is a control language to page-intermediate parser 26, a page intermediate code storage area 28, a rasterizer procedure 30 which includes a patterning procedure 32 and a rasterized page strip bitmap storage area 34. Rasterizer procedure 30 enables CPU 20 to control image processor 24 to convert page intermediate data 28 to a rasterized bitmap image 34 of a page strip. Rasterizer procedure 30 further includes patterning procedure 32 which is the principal algorithm that enables just-in-time patterning of the page strip raster bitmap 34.

While each of the procedures described above is illustrated as being present in memory 16, such procedures may be recorded on one or more diskettes 35 which are loaded into memory 16 via a floppy drive in CPU 20.

Figure 2:
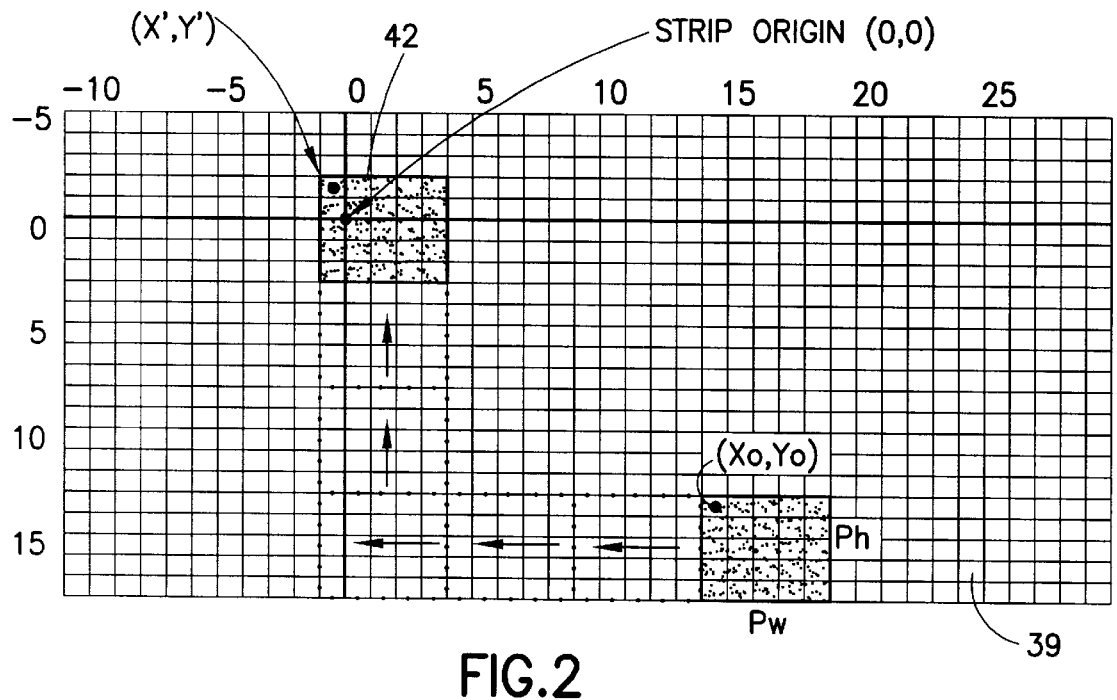
FIG. 2 and FIGS. 6–7 is a schematic illustration of a back propagation of an anchor point of an mxn scaled pattern to the origin region of a page strip.

FIG. 2 illustrates an upper left-hand corner of a representative page strip 39 and further shows an original pattern bitmap 40 which is 5 pixels wide by 5 pixels high (Pw=5, Ph=5). The anchor point of original pattern bitmap 40 is positioned at the intersection of Xo=14 and Yo=13 as counted from strip origin 90. As will hereafter be understood, the procedure first back-propagates original pattern bitmap 40 to the area of page strip origin 0,0, to transform original pattern bitmap 40 into reference pattern bitmap 42. The back propagation comprises (conceptually) an incrementing of original pattern bitmap 40 back along the X axis until it adjoins or encompasses the Y axis, and then further incrementing original pattern bitmap 40 vertically until it reaches the vicinity of page strip origin 0,0.

Note that anchor X',Y' of reference pattern bitmap 42 is positioned at (X',Y')=(−1,−2) again counted from strip origin 0,0. Thus, if the pattern of reference pattern bitmap 42 is now propagated along or down page strip 39, its pattern will be exactly in phase with the pattern of original pattern bitmap 40. The back-propagation action enables subsequent procedures to ignore the portions of reference pattern bitmap 42 that are exterior to page strip 39 and assures a coherence of the image represented by reference pattern bitmap 42 with the image of original pattern bitmap 40.

To accomplish bitmap back-propagation, the algorithm employs the following expressions:

$$X'=(Xo \bmod Pw)-Pw \qquad (1)$$

$$Y'=(Yo \bmod Ph)-Ph \qquad (2)$$

After back-propagation, rasterizing procedure 30 is called to fill a scan line portion with the pattern represented by reference pattern bitmap 42. Rasterizing procedure 30 then passes an empty scan line to patterning procedure 32. Patterning procedure 32 then indexes to a pattern pixel in reference pattern bitmap 42 which corresponds to the anchor point (Ox,Oy) of a marking object (e.g., a rectangle, square, etc.). Thereafter the attribute (e.g. a color) assigned to the reference pattern pixel is assigned to the pixel at the anchor point of the marking object. The patterning procedure continues until all pixels in the marking object have been assigned attributes from corresponding pixels of reference pattern bitmap 42. During this process, if the pattern is exhausted before the scan line portion is reached, the pattern is automatically indexed to the beginning of the same pattern row, causing a tiling to occur as a result of the scan line fill process.

Figure 3:
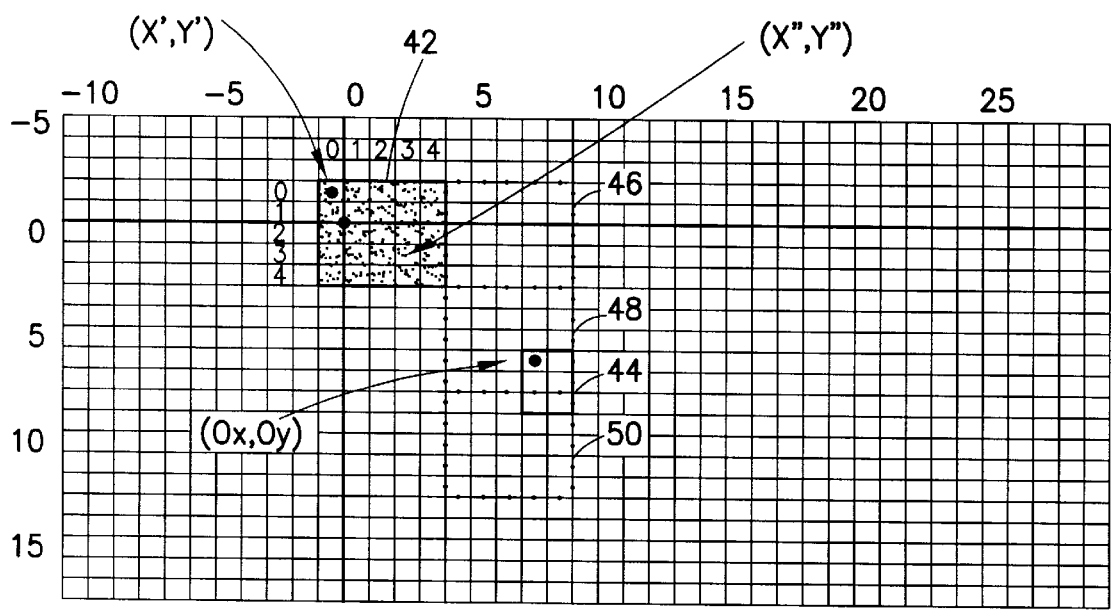
FIG. 3 and FIG. 8 is a schematic representation of a region within a page strip to be filled by a pattern and a specific pixel from the reference pattern image bitmap whose attribute is chosen to be ascribed to a pixel within the fill region.

Referring now to FIG. 3, the fill procedure is illustrated, using reference pattern bitmap 42 which was derived in accordance with the procedure described for FIG. 2. Assume that region 44 is to be filled with the pattern present in reference pattern bitmap 42. If the procedure were to simply increment pattern 42, in a tiling manner, so that the correct pixels of reference pattern bitmap 42 overlay region 44, the incrementing shown by dashed dotted lines 46, 48 and 50 would be performed. The result would be that the six pixels within region 44 would be allocated attributes from the reference pattern bitmap pixels overlaying them. Thus, the upper 4 pixels of region 44 would be allocated the respective attributes from the lower right four pixels of reference pattern bitmap 42 and the lower-most two pixels of region 44 would be allocated the two upper right pixels from reference pattern bitmap 42.

Rather than incrementing reference pattern bitmap 42 as described above, which would require highly intensive processing operations, each pixel of region 44 is processed in accordance with its X, Y coordinate, the X',Y' coordinate of the anchor point of reference pattern bitmap 42 and the pattern width (Pw) and pattern height (Ph) parameters. Thereafter the coordinates X",Y" of the pixels in reference pattern bitmap 42 which correspond to the pixels in region 44 are determined. The processing occurs in accordance with the following expressions:

$$\text{if: } (Ox > (Pw + X')) \tag{3}$$

$$\text{then: } X" = ((Ox \bmod Pw) - X') \bmod Pw \tag{4}$$

$$\text{else: } X" = Ox - X' \tag{5}$$

$$\text{if: } (Oy > (Ph + Y')) \tag{6}$$

$$\text{then: } Y" = ((Oy \bmod Ph) - Y') \bmod Ph \tag{7}$$

$$\text{else: } Y" = Oy - Y' \tag{8}$$

More specifically, if region 44 is anchored at Ox=7, Oy=6, (again counted with reference to strip origin 0,0), it is positioned as shown in FIG. 3. Given such a positioning, X" and Y" are determined as follows:

$$X" = ((7 \bmod 5) - (-1)) \bmod 5 = 3$$

$$Y" = ((6 \bmod 5) - (-2)) \bmod 5 = 3$$

Accordingly, pixel (7,6) in region 44 is colored with the attribute associated with pixel (3,3) from reference pattern 42.

Figure 4:
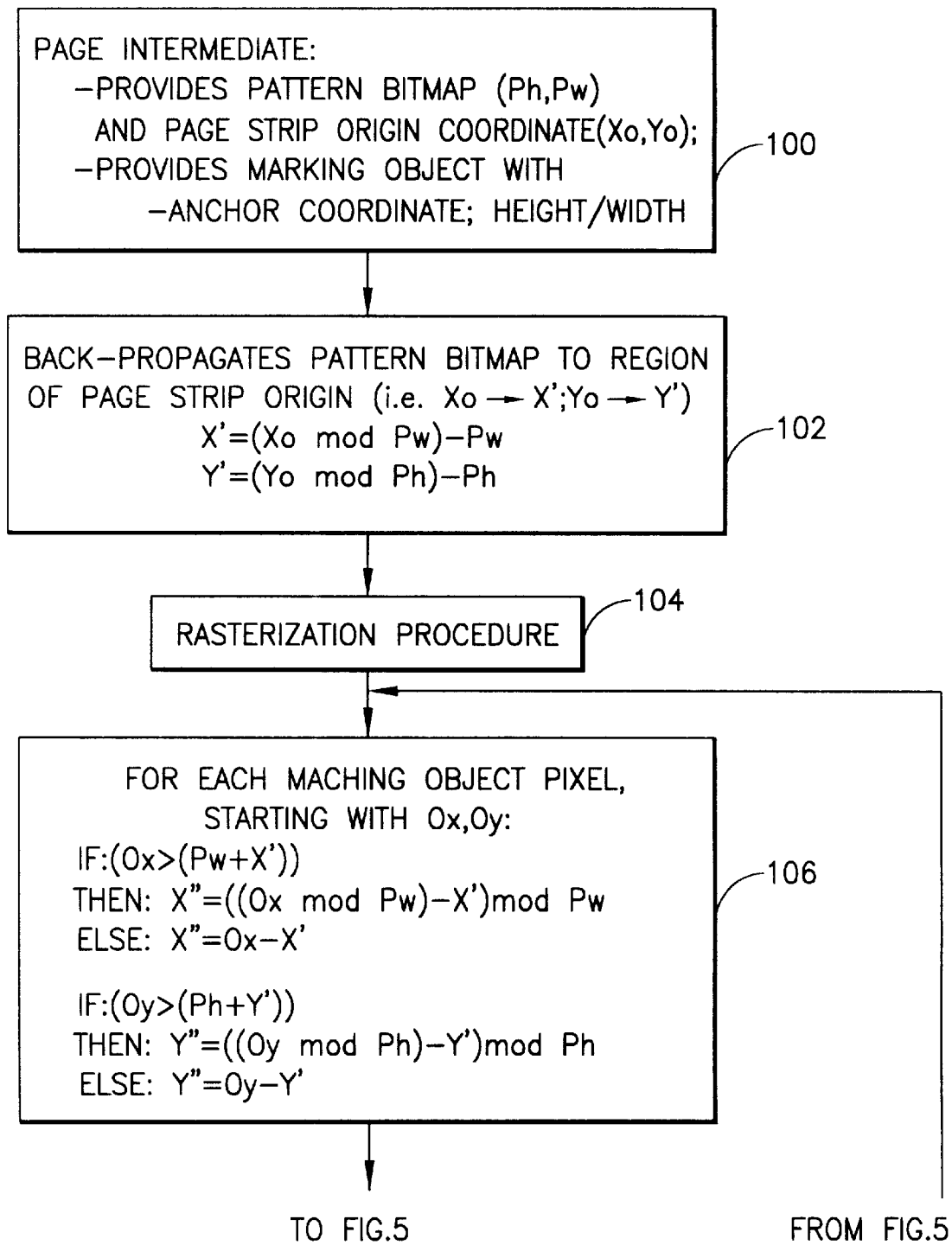
FIGS. 4 and 5 comprise a flow diagram illustrating the procedure of the invention.
Figure 5:
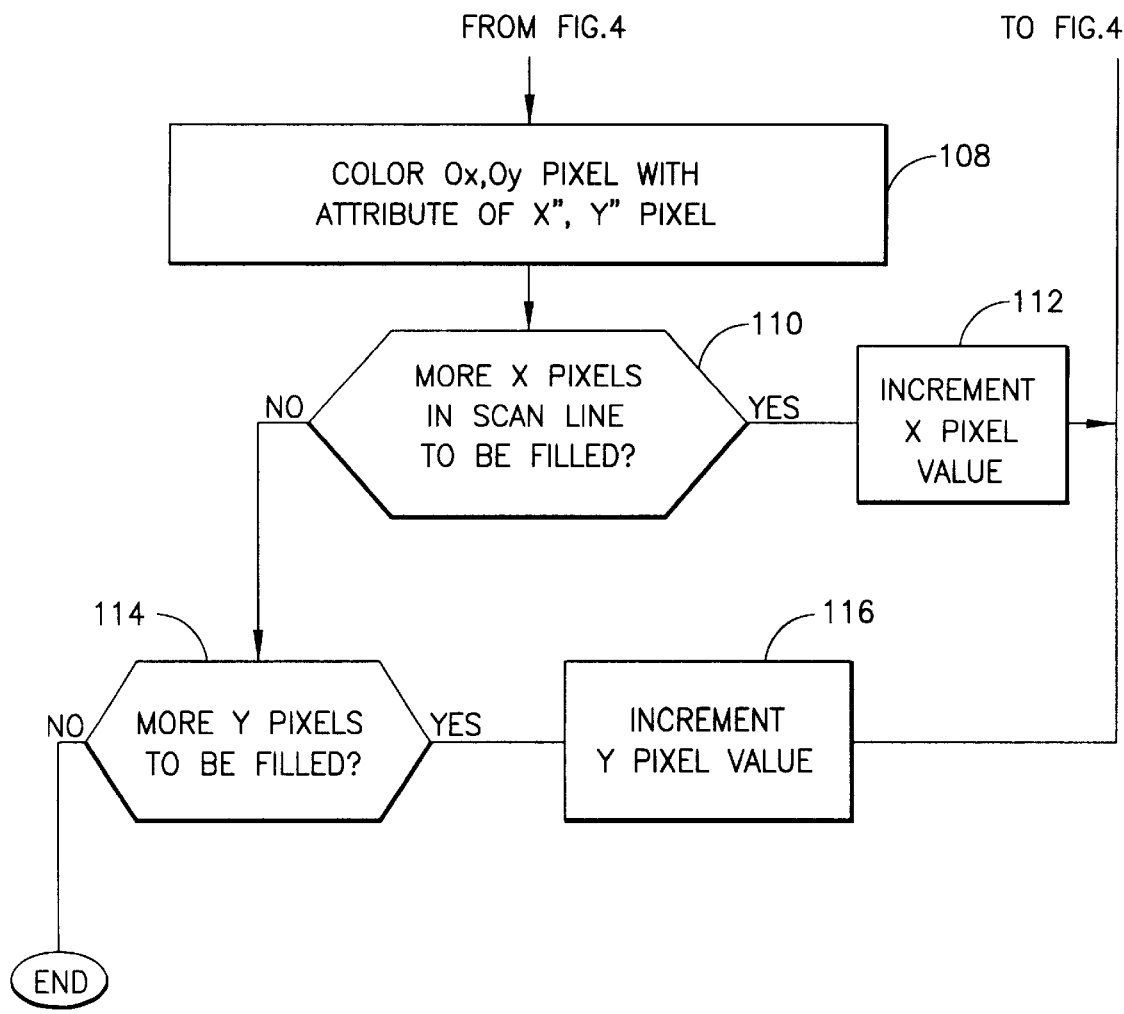

Turning now to FIGS. 4 and 5, a detailed description of the procedure of the invention will be given, followed by a further example, using the pattern arrangement shown in FIGS. 6, 7, and 8. Referring first to FIG. 4, patterning procedure 32 (FIG. 1) receives from the page intermediate listing: a user defined pattern bitmap having a height Ph and a width Pw and a page strip origin point (Xo, Yo). It further receives a geometric object to be filled, a height value, a width value and anchor point coordinates Ox, Oy (box 100).

Patterning procedure 32 than back-propagates the pattern bitmap to the page strip origin such that the anchor pixel (generally, the upper left pixel) of the user-defined pattern bitmap is positioned at image bitmap coordinate X',Y', wherein X' and Y' are derived in accordance with expressions (1) and (2) above (box 102).

Next, page strip rasterization commences (box 104) and patterning procedure 32 is executed for each image pixel (e.g. within region 44, FIG. 3) which is to be assigned a pattern attribute from reference pattern bitmap 42. The procedure starts with the origin pixel (Ox,Oy) of the region to be filled and determines the corresponding reference pattern bitmap pixel whose attribute is to be assigned (box 106). The pixel identity is determined in accordance with expressions (3)–(8), shown above.

Once the corresponding reference pattern bitmap pixel is identified, its attribute is assigned to the origin pixel of region 42 (box 108). Thereafter, it is determined if any more pixels are present in region 42 that are to be processed along the X dimension thereof (decision box 110) and if yes, the X pixel value is incremented (box 112) and the procedure recycles back to box 106. If no, the procedure moves to decision box 114 where it is determined if there are any more pixels to be processed in the Y dimension of region 42. If yes, the Y pixel value is incremented and the procedure recycles back to box 106 and continues (box 116). If no, the rasterization procedure continues until the page strip has been fully rasterized, at which time the procedure either moves to a next page strip or the operation is at an end.

Figure 6:
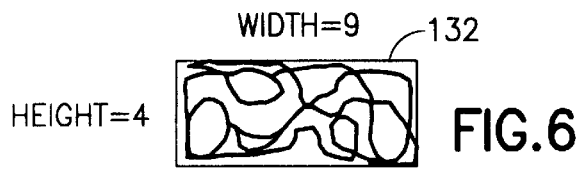
Figure 7:
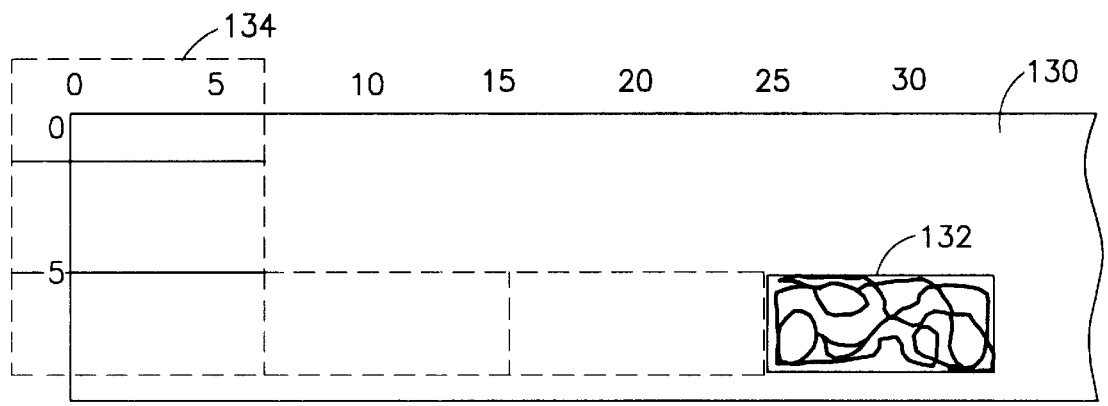
Figure 8:
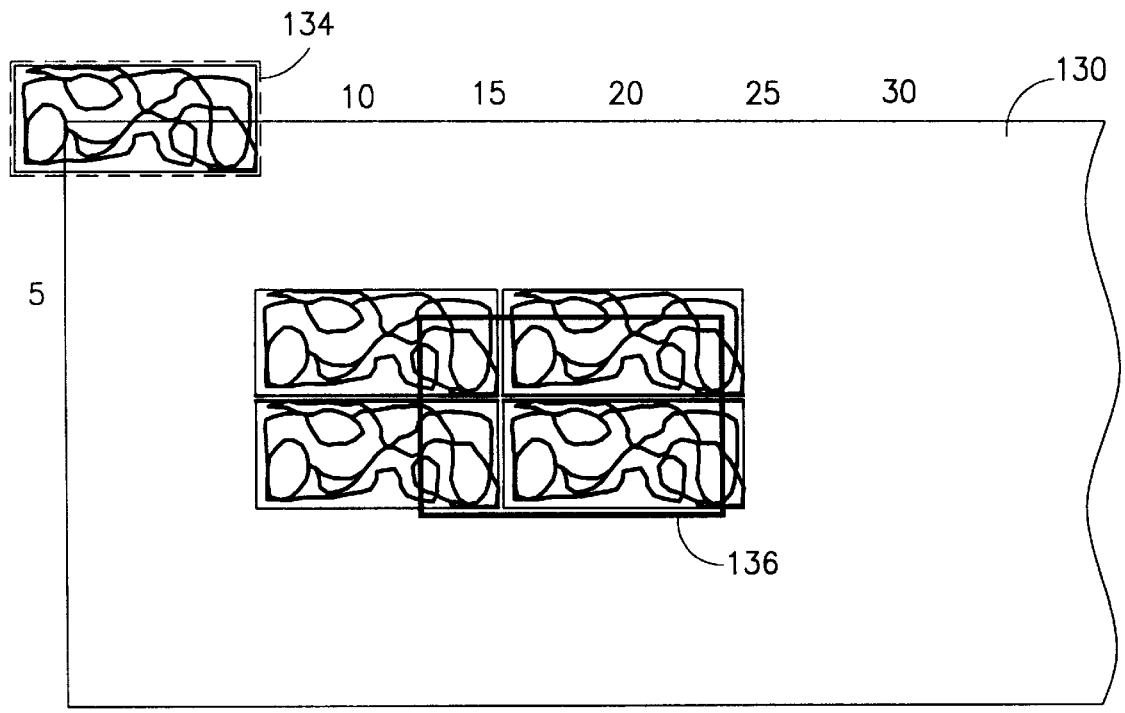

Referring now to FIGS. 6–8, a page strip 130 and user-defined pattern bitmap 132 are provided to patterning procedure 36. Pattern bitmap 132 has a pixel height Ph=4 and a pixel width of Pw=9. Assume that a rectangle 136 anchored at 13, 7, with a width of 11 and a height of 9 is to be filled by pattern 132 in page strip 130. The display list supplied to rasterizer procedure 30 includes both pattern 132 and the rectangle 136.

Shown in FIG. 7 is page strip 130 with the original pattern bitmap 132 anchored at X=25, Y=6. Shown, in dotted lines, are the logical steps taken to transform original pattern bitmap 132 back to the region of the origin of the strip. This procedure retains a phase coherency between the pixels of reference pattern bitmap 134 and those of the original pattern bitmap. It further eliminates any need to consider "delta" pixels, wherein "delta" pixels are those pixels of reference pattern bitmap 138 which fall outside of the boundaries of page strip 130 and enables coherency to be maintained between the subsequent patterning and the original pattern bitmap 132.

In this case, the anchor point of reference pattern bitmap 134 is positioned at X'=−2 and Y'=−2. As indicated above, the aforedescribed back-propagation is accomplished through use of expressions 1 and 2, shown above.

After back-propagation, a definition of rectangle 136 is parsed from the display list and patterning procedure 32 takes the rectangle definition and asks for pixels from reference pattern bitmap 134 in order to colorize rectangle 136. Given a point X,Y in rectangle 136, there will always exist a reference pattern bitmap pixel with which to colorize the rectangle pixel. The colorization procedure occurs in accordance with the steps described in the flow diagram of FIGS. 4 and 5, and results in the box 136 being filled as shown in FIG. 8.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for processing an image to derive a bitmap representation of the image, said bitmap representation including a region comprising a pattern, said method comprising the steps of:

a) accessing an original pattern bitmap having an anchor point within said bitmap representation;

b) logically translating said original pattern bitmap to a reference pattern bitmap position at an origin of said bitmap representation, such that a pattern manifest by said reference pattern bitmap exhibits a consistent in-phase relationship with a pattern manifest by the original pattern bitmap;

c) filling said region with said pattern by determining a correspondence of an anchor pixel in said region to a pixel in said reference pattern bitmap, and ascribing an attribute of said pixel in said reference pattern bitmap to said anchor pixel in said region; and d) repetitively determining a correspondence of each further pixel in said region to a corresponding further pixel in said reference pattern bitmap, and ascribing an attribute of each said further pixel in said reference pattern bitmap to each said corresponding further pixel, respectively, in said region.

2. The method as recited in claim 1, wherein said original pattern bitmap has a height of Ph pixels, a width of Pw pixels and an origin pixel positioned within said bitmap representation at pixel Xo,Yo, and step b) causes said origin pixel to be logically positioned about the origin of said bitmap representation by logically translating said original pattern bitmap by integer multiples of Ph and Pw.

3. The method as recited in claim 2 wherein step b) causes said origin pixel to be positioned at X',Y' where:

X'=(Xo mod Pw)−Pw

Y'=(Yo mod Ph)−Ph.

4. The method as recited in claim 2, wherein said region to be filled includes an anchor pixel located at Ox,Oy and step c) logically translates said reference pattern bitmap by integer multiples of Ph and Pw until a pixel at X",Y" of said reference pattern bitmap is logically overlaid onto said anchor pixel.

5. The method as recited in claim 4 wherein step c) causes the origin pixel at X',Y' to be determined as follows:

if: Ox>(Pw+X')

then: X"=((Ox mod Pw)−X')mod Pw else: X"=Ox−X'; and if: Oy>(Ph+Y')

then: Y"=((Oy mod Ph)−Y')mod Ph else: Y"=Oy−Y'.

6. A memory media for controlling a processor to process an image to derive a bitmap representation of the image, said bitmap representation including a region comprising a pattern, said memory media comprising:

a) means for controlling the processor to access an original pattern bitmap having an anchor point within said bitmap representation;

b) means for controlling the processor to logically translate said original pattern bitmap to a reference pattern bitmap at a position at an origin of said bitmap representation, such that a pattern manifest by said reference pattern bitmap exhibits a consistent in-phase relationship with a pattern manifest by the original pattern bitmap;

c) means for controlling the processor to fill said region with said pattern by determining a correspondence of an anchor pixel in said region to a pixel in said reference pattern bitmap, and to ascribe an attribute of said pixel in said reference pattern bitmap to said anchor pixel in said region; and d) means for controlling the processor to repetitively determine a correspondence of each further pixel in said region to a corresponding further pixel in said reference pattern bitmap, and to ascribe an attribute of each said further pixel in said reference pattern bitmap to each said corresponding further pixel, respectively, in said region.

7. The memory media as recited in claim 6, wherein said original pattern bitmap has a height of Ph pixels, a width of Pw pixels and an origin pixel positioned within said bitmap representation at pixel Xo,Yo and means b) causes said origin pixel to be logically positioned about the origin of said bitmap representation by logically translating said original pattern bitmap by integer multiples of Ph and Pw.

8. The memory media as recited in claim 7 wherein said means b) causes said origin pixel to be positioned at X',Y' where:

X'=(Xo mod Pw)−Pw

Y'=(Yo mod Ph)−Ph.

9. The memory media as recited in claim 7, wherein said region to be filled includes an anchor pixel located at Ox,Oy and means c) causes a logical translation of said reference pattern bitmap by integer multiples of Ph and Pw until a pixel at X",Y" of said reference pattern bitmap is logically overlaid onto said anchor pixel.

10. The memory media as recited in claim 9 wherein said means c) causes the origin pixel at X',Y' to be determined as follows:

if: Ox>(Pw+X')

then: X"=((Ox mod Pw)−X')mod Pw else: X"=Ox−X'; and if: Oy>(Ph+Y')

then: Y"=((Oy mod Ph)−Y')mod Ph else: Y"=Oy−Y'.

* * * * *